United States Patent [19]

Kohama et al.

[11] 4,380,328

[45] Apr. 19, 1983

[54] SHAFT FURNACE FOR REDUCING ORES

[75] Inventors: Hiroyuki Kohama, Daito; Masaru Tamiya, Kobe; Sunichi Mizukami, Kobe; Dentaro Kaneko, Kobe; Yoshio Kimura, Akashi, all of Japan

[73] Assignee: Kobe Steel, Ltd., Kobe, Japan

[21] Appl. No.: 116,458

[22] Filed: Jan. 29, 1980

[30] Foreign Application Priority Data

Jan. 29, 1979 [JP] Japan .................................. 54-9596
Feb. 23, 1979 [JP] Japan ................................. 54-21712

[51] Int. Cl.³ .............................................. F27B 9/20
[52] U.S. Cl. ....................................... 266/177; 75/34
[58] Field of Search ............... 266/197, 177, 176, 181; 75/34, 35, 26, 90

[56] References Cited

U.S. PATENT DOCUMENTS

| | | | |
|---|---|---|---|
| 1,289,800 | 12/1918 | Jones | 266/197 |
| 1,448,340 | 3/1923 | Fleischer | 266/197 |
| 3,558,118 | 1/1971 | Jensen | 266/141 |
| 3,722,869 | 3/1973 | Moore | 266/195 |
| 3,889,864 | 6/1975 | Celada et al. | 266/197 |
| 3,957,486 | 5/1976 | Sandoval et al. | 75/34 |

OTHER PUBLICATIONS

Kaneko et al., *Iron & Steel* vol. 63, No. 14 pp. 2269-2277, 1977, Japan.
Kaneko et al., *Iron & Steel* vol. 64, No. 6, pp. 681-690, 1978 Japan.
Kaneko et al., *Tran of Iron & Steel Ins of Japan* vol. 18, pp. 421-428, 1978.
Kaneko *SEA ISI Quarterly*, pp. 19-32, 1978.

*Primary Examiner*—M. J. Andrews
*Attorney, Agent, or Firm*—Oblon, Fisher, Spivak, McClelland & Maier

[57] ABSTRACT

A shaft furnace for reducing ores with a gas, wherein the furnace is constructed to destroy the plug-flow state of ores in or above a plug-flow zone where a reduction ratio of the ores is 50 to 70%, in order to prevent the clustering by changing the plug-flow zone into a shear-flow zone. Further, the shaft furnace for reducing ores with a gas is so constructed that a hydraulic radius R (cm) of the furnace in the reduction zone in which the reduction ratio is greater than 50% is selected to be, $$R \leq 120 \exp(8.6 - 0.009T)$$

wherein T denotes the temperature (°C.) of the reducing gas, in order to prevent the clustering.

1 Claim, 26 Drawing Figures

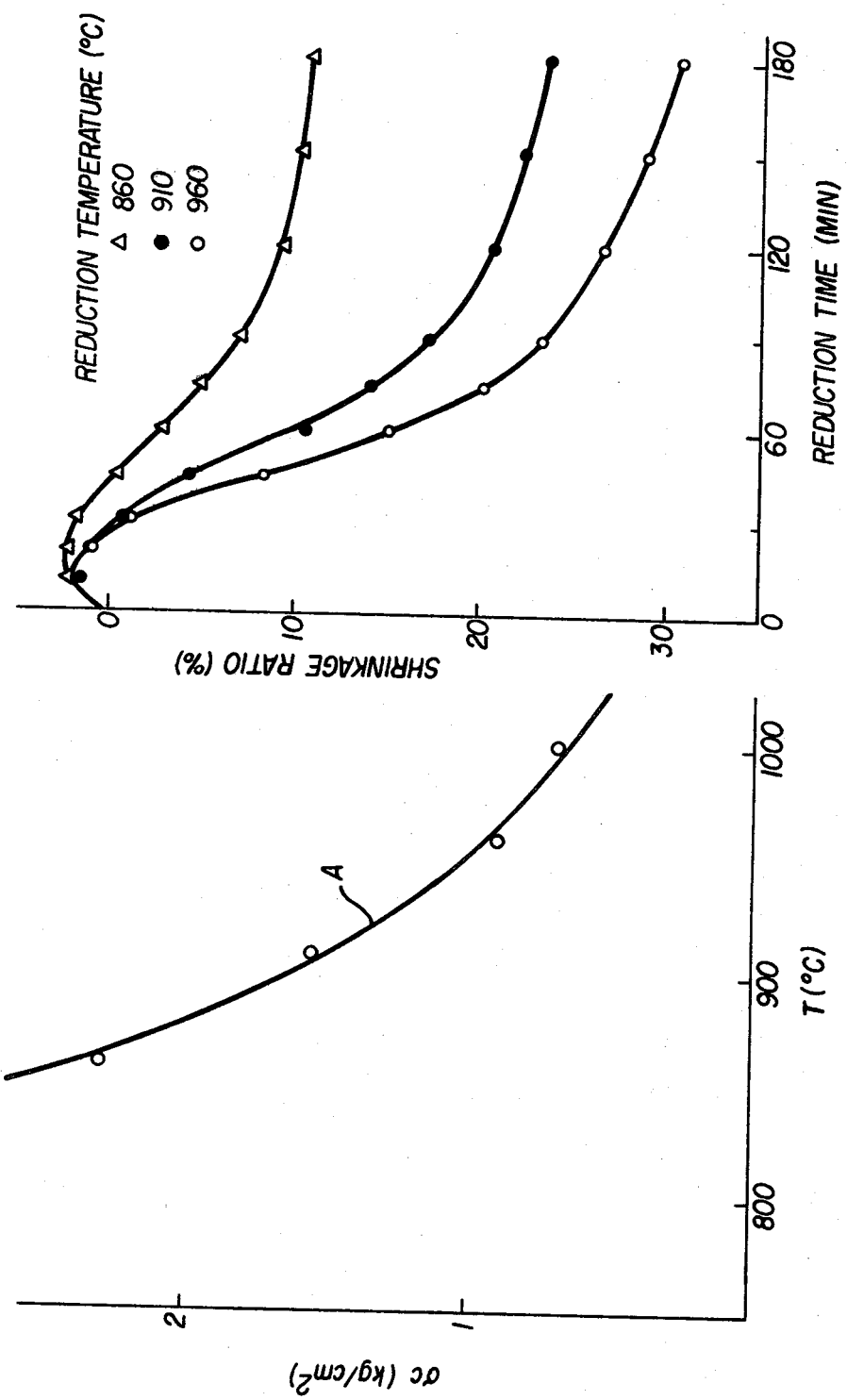

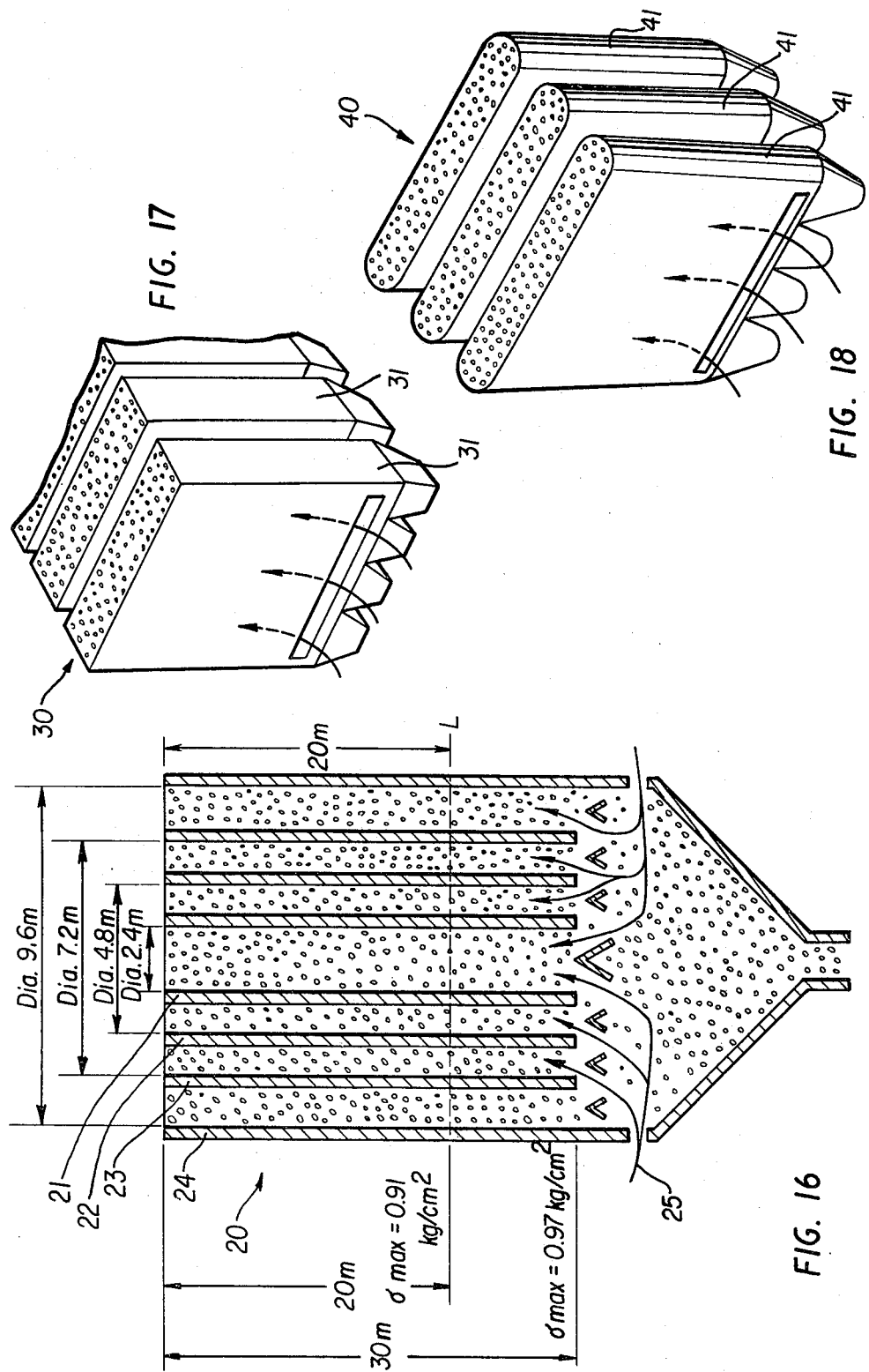

SHAFT FURNACE FOR REDUCING ORES

BACKGROUND OF THE INVENTION

1. Field of the Invention

The present invention relates to a shaft furnace for directly reducing the ores by the counter-flow of ores which descends in the furnace and a reducing gas which rises in the furnace.

2. Description of the Prior Art

The production of reduced iron by the shaft furnace of this type has long been placed in the industrial applications. To increase the productivity by the shaft furnace of this system, it is necessary to essentially increase the rate of reduction reaction. For this purpose, the reduction temperature may be elevated or the reaction pressure may be increased. As for the method of increasing the reacting pressure, i.e., as for the operation system under elevated pressure, a pilot plant has been already developed and there has been reported that the reduction time was remarkably reduced by the operation under the pressure of 4 kg/cm$^2$G. With the operation of the system under high pressure, however, a specially designed sealing mechanism must be employed to cope with the increased pressure, requiring increased cost for the construction of facilities.

On the other hand, the method of increasing the productivity by raising the reduction temperature is advantageous as compared with the high-pressure operation system because it does not require increased cost for the construction of the aforementioned facilities. This method, however, presents such a problem that the burden materials are often clustered with each other due to elevated temperature.

That is, ores which are the burden materials accumulate and gradually descend through the shaft furnace. In a high-temperature zone at the lower portion of the reduction zone, therefore, the clustering develops such that ores adhere with each other due to metallurgical change as a result of the pressure of ores (pressure which generates in the ore layer due to the self weight of the ores) and reduction of ores, giving rise to the occurrence of deflection in the flow of reducing gas as well as the occurrence of hanging. In extreme cases, therefore, it becomes difficult to continue the operation, presenting a serious problem in producing the reduced iron with the shaft furnace of this type.

To avoid the clustering, it has been attempted to use ore pellets admixed with small amounts of limestone (refer to the specification of U.S. Pat. No. 3,957,486). In this case, however, limitation is imposed on the ores which are to be processed.

Furthermore, to prevent the clustering with the conventional methods, it was often attempted to provide agitating wings, baffle plates or burden feeders at the lower portion of the furnace to destroy the clustering (refer, for example, to U.S. Pat. No. 3,558,118).

Thus, there had been no effective method for preventing the clustering in the reduction zone.

In view of such circumstances, the inventors of the present invention have conducted research in relation to the phenomenon of clustering, and have previously announced the results in a paper entitled "Reduction Properties of Raw Materials for Direct Reduction Shaft Furnace", Iron and Steel, 1977, Vol. 63, No. 14, pp. 2269-2277, by Dentaro Kaneko et al., and in a paper entitled "Clustering Phenomena during Iron Oxide Reduction in Shaft Furnace", Iron and Steel, 1978, Vol. 64, No. 6, pp. 681-690, by Dentaro Kaneko et al.

In a series of these studies, it was clarified that the clustering which takes place during the reduction process of a shaft furnace is a sintering phenomenon by diffusion of solid metallic iron that is formed by the reduction, and that if microstructurally considered, the clustering develops and grows by the intertwining of fibrous metallic iron that is formed by the reduction. It was further clarified that the clustering is caused by the three principal factors; i.e., reduction temperature, compressive load which acts upon the burden raw materials, and properties of the burden raw materials. At the same time, various effects by these factors upon the clustering were also clarified.

The present inventin was accomplished based upon the results of such studies and various experiments and simulation tests performed in relation to the formation of cluster, reduction conditions of ores in the furnace, flowing conditions in the furnace, and the like.

SUMMARY OF THE INVENTION

The fundamental object of the present invention therefore is to provide a shaft furnace for reducing ores, which does not develop the clustering. More specifically, the present invention is to provide a shaft furnace for reducing ores, having such an internal-furnace construction and/or an furnace construction per se that will not develop clustering, and to provide a shaft furnace for reducing ores, having a furnace construction so as to maintain a range of the compressive load that does not develop clustering.

In order to attain the above-mentioned objects, a first embodiment of the present invention deals with a shaft furnace for reducing ores with a gas, wherein a mechanism is provided to destroy the plug-flow state of ores in a cluster forming plug-flow zone where a reduction ratio of the ores is 50 to 70%, or in a plug-flow zone just above the cluster forming plug-flow zone, in order to prevent the clustering by changing the plug-flow zone into a shear-flow zone.

A second embodiment of the present invention deals with a shaft furnace for reducing ores with a gas at a temperature of higher than 900° C., wherein a hydraulic radius R (cm) of the furnace in the reduction zone where the reduction ratio is greater than 50% is selected to be, $$R \leq 120 \exp(8.6 - 0.009T)$$

wherein T denotes the temperature (°C.) of the reducing gas, in order to prevent the clustering.

A third embodiment of the present invention deals with a shaft furnace for reducing ores with a gas, wherein a mechanism is provided to destroy the plug-flow state of ores in a cluster forming plug-flow zone where a reduction ratio of the ores is 50 to 70%, or in a plug-flow zone just above the cluster forming plug-flow zone, and a hydraulic radius R (cm) of the furnace in the reduction zone where the reduction ratio is greater than 50% is slected to be, $$R \leq 120 \exp(8.6 - 0.009T)$$

wherein T denotes the temperature (°C.) of the reducing gas, in order to prevent the clustering.

A fourth embodiment of the present invention deals with a shaft furnace of the above-mentioned third embodiment, wherein the shaft furnace is the one which reduces the ores at a temperature as high as 900° C. or more.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 11 is a graph showing the change in critical pressure $\sigma_C$ with respect to the reduction temperature;

FIG. 12 is a graph showing the change in shrinkage ratio with respect to the reduction time under various reduction temperatures;

FIGS. 14, 15 and 16 are cross-sectional diagrams illustrating the shaft furnaces according to the present invention;

FIGS. 17 and 18 are perspective views schematically illustrating the shaft furnaces according to other embodiments of the present invention;

(In FIGS. 3, 6, 7 and 8, symbol PF denotes a plug-flow zone, SF denotes a shear-flow zone, reference numeral 1 represents a burden feeder, 2 represents shaft furnace, 3 denotes a baffle plate, 4 denotes agitating wings, 5 denotes a drive shaft, 6 denotes agitating means, and L represents a line of 60% reduction; and in FIGS. 14 to 23, reference numeral 2 denotes a shaft furnace wherein 7 denotes an inner cylinder, and 8 denotes an outer cylinder, 10 denotes a shaft furnace wherein 11 denotes a cylinder, 12 a double cylinder, and 13 a conical portion, 20 denotes a shaft furnace wherein 21, 22, 23 and 24 denote cylinders/chambers, 30 and 40 denote shaft furnace wherein 31 and 41 represent single cylinders, 50, 60 and 70 represent shaft furnaces wherein 52, 62 and 72 denote separator plates, 80 denotes a shaft furnace wherein 81 represents a single cylinder, 82 a cylinder having small diameter, and 83 a connection pipe, and L represents a line of 60% reduction.

DETAILED DESCRIPTION OF THE PREFERRED EMBODIMENTS

First, below is mentioned in detail the internal-furnace construction of a shaft furnace for reducing ores, which is capable of preventing the clustering.

In order to find major causes for forming cluster, the inventors of the present invention have observed the flowing state of ores in the furnace, and have confirmed the fact that the neighboring ore particles cease the movement relative to each other in a reduction zone where the reduction is effected to 50 to 70% and creates a plug-flow by which the particles of ores descend maintaining the same surfaces relative to each other or maintaining the state of point-to-point contact. The inventors have further confirmed that as the reduction ratio proceeds to 50 to 70% or more, the ore particles descend in plug-flow, maintaining the same surfaces or point-to-point contact and undergo the solid-phase sintering to form the cluster.

The present invention, therefore, is to provide a shaft furnace in which the plug-flow which is a cause of cluster is destroyed in a reduction ratio range of 50 to 70% where the formation of cluster is started, by establishing a shear-flow zone so that ore particles will revolve or acquire linear motion relative to each other to change the contacting surfaces or points among the particles, in order to prevent or restrain the formation or growth of cluster.

Figure 3:
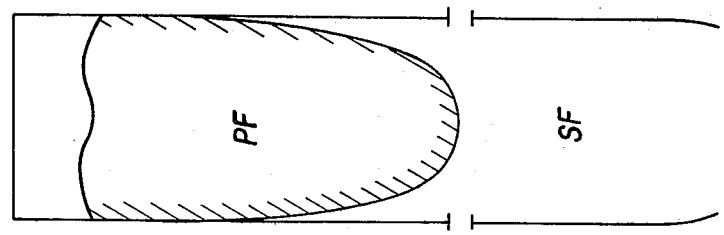
FIG. 3 is a cross-sectional view showing the flowing state of ores by a two-dimensional model shaft furnace having the same cross-sectional shape as that of the model furnace shown in FIG. 1.
Figure 2:
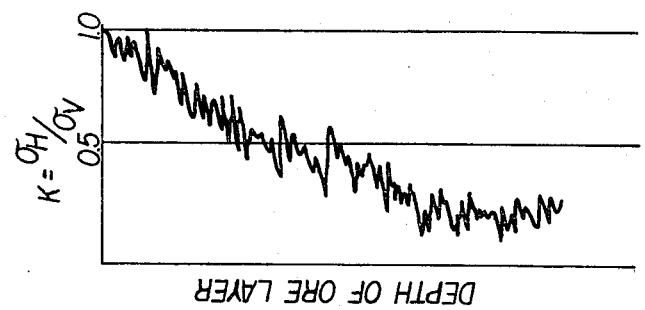
FIG. 2 is a graph showing the change in the ratio K of horizontal pressure $\sigma_H$ to vertical pressure $\sigma_V$ in the direction of a center line of the model furnace of FIG. 1.
Figure 1:
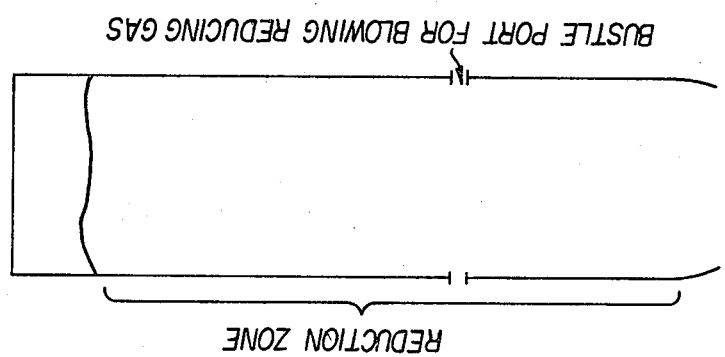
FIG. 1 is a cross-sectional view illustrating a model furnace used for the experiments of the present invention.

To examine the descending state of ores in the shaft furnace, a model of three-dimensional shaft furnace 1 m in diameter and about 5 m in height (3 m for cylindrical portion and 2 m for conical portion) was constructed as shown in FIG. 1. Pellets having a particle size of 12 mm were introduced into the model furnace to measure the pressure on the central line of the model furnace, i.e., to measure a ratio K of horizontal pressure $\sigma_H$ to vertical pressure $\sigma_V$. The results were as shown in FIG. 2, from which it will be learned that the pressure ratio K is close to unity at the upper portion of the furnace, gradually decreases toward the middle portion, and converges to a Rankin's constant (0.218) which is found when the angle of friction in the pellet layer is $\phi i = 40°$ in the lower portion of the furnace. The results of FIG. 2 teaches the following fact. Namely, when the pressure ratio is $K = 1$ in the upper portion of the furnace, the pressure of the ore layer in the upper portion of the furnace does not yet reach the yielding state ($\tau = C + \sigma \tan \phi i$, where $\tau$ represents a shear pressure, C a constant which represents cohesion, and $\sigma$ a normal pressure) of Mohr-Coulomb, but remains in a pressure state which is close to hydro-static state. In such an unyielding state, the ore layer does not undergo the deformation or destruction; the ores descend in the plug-flow state maintaining the same surfaces or point-to-point contact state. In the lower portion of the furnace, on the other hand, the pressure of the ore layer is converged to the Rankin's constant (K=0.218) which indicates Mohr-Coulomb's criterion of yielding. Therefore, the ore layer is under such a pressure that develops deformation or destruction, whereby the ores descend in a shear-flow in which the ore particles are caused to revolve or move linearly. Near the walls of the furnace, the pressure ratio K converges to a value close to the Rankin's constant (K=0.218) even in the upper portion of the furnace, thereby establishing the shear-flow. When these conditions were observed using a model of two-dimensional shaft furnace having the same shape in cross section, it was recognized as shown in FIG. 3 that a plug-flow zone PF was formed downwardly protruding from the upper portion to the middle portion of the furnace, and a shear-flow zone SF was formed beneath the plug-flow zone PF. The results of FIG. 3 were in good agreement with the measured results of pressure of FIG. 2.

In the plug-flow zone, the ores are not permitted to move relative to each other but are permitted to descend in a static manner, resulting in creating conditions for forming the cluster. Below are mentioned the reduction conditions in the furnace and the development of clustering.

Figure 4:
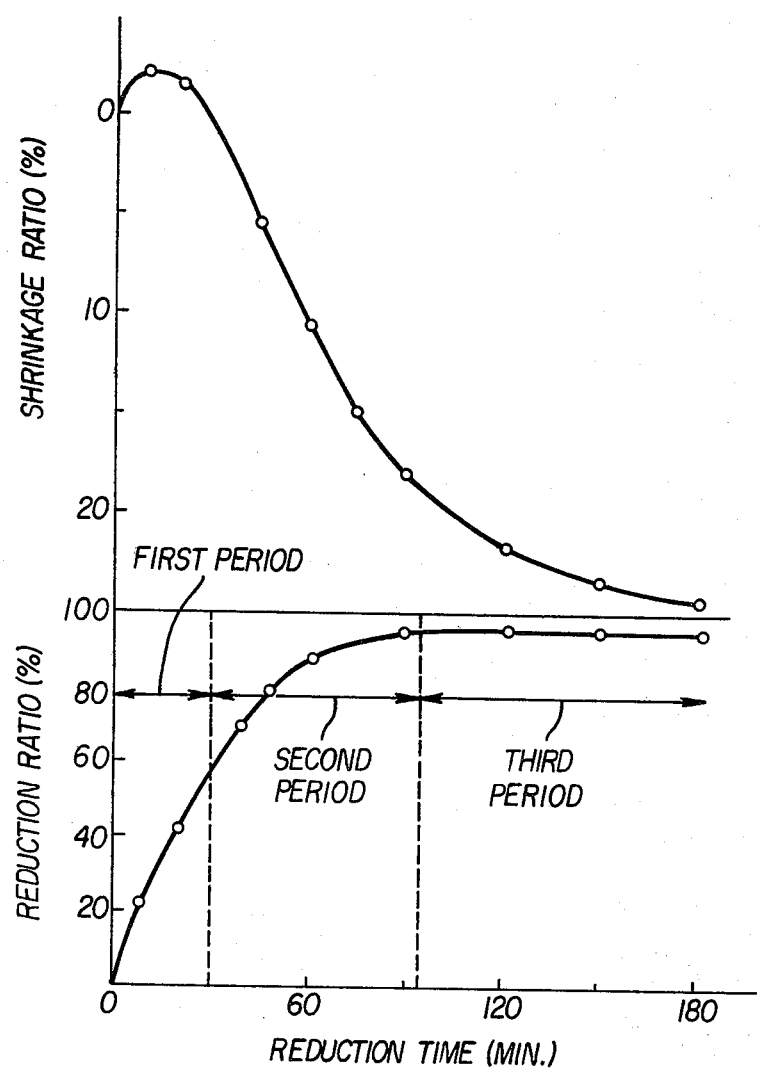
FIG. 4 is a graph showing a relation between the shrinkage ratio and the reduction ratio when the reduction time is represented by the abscissa.

FIG. 4 is a diagram showing the change of shrinkage ratio and reduction ratio of ore layer when high-grade oxidized pellets of an iron grade of 68.4% are reduced under the conditions of a reduction temperature of 910° C. and an ore pressure of 2 kg/cm². As will be obvious from FIG. 4, there exists a strong correlation which serves as an indication of cluster formation between the shrinkage ratio and the reduction ratio of the ore layer. In a first period in which the reduction quickly proceeds from 0% to 50-70%, the ores are swollen while $Fe_2O_3$ is reduced to $Fe_3O_4$ which is then reduced to FeO. In this period, metallic iron is less formed. In other words, no cluster is formed in this period of reduction and swelling.

In a second period in which the reduction ratio proceeds from 50-70% to a nearly saturated state of 90-98%, the ore layer is quickly shrunk, unlike that of the first period. At the same time, the reduction reaction of FeO to Fe is promoted, resulting in permitting the formation of fibrous metallic iron to be remarkably promoted. During the step of such rapid shrinkage, the fibers of metallic iron intertwine with each other as the reduction proceeds, whereby the cluster is allowed to rapidly grow, being assisted by the intertwining. The degree of shrinkage is reduced in a third period where the reduction ratio reaches a nearly saturated state of 90 to 98%. Even in the third period, however, the cluster continues to grow.

Therefore, as will be obvious from the aforementioned description, if the zone in which the reduction ratio reaches 50 to 70% resides in the plug-flow zone PF, the formation of cluster is further promoted.

Namely, in the plug-flow zone PF, the ores descend at a constant speed maintaining the same surfaces or point-to-point contact. Therefore, the fibrous metallic iron grows with the reduction maintaining the intertwined state. The degree of intertwining is further promoted by the increase in the contact areas caused by the plastic deformation as a result of the softening of ores, whereby the cluster having high degree of bonding is formed.

Figure 5:
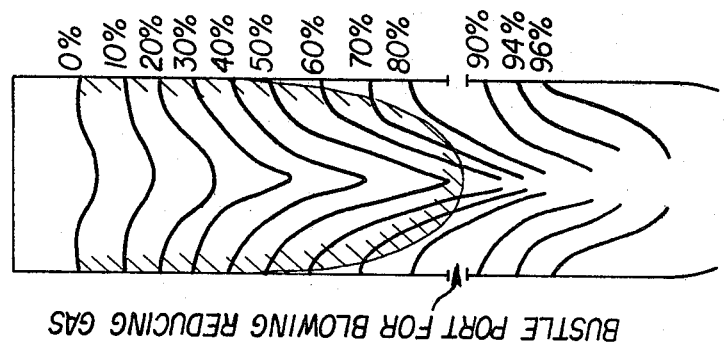
FIG. 5 is a cross-sectional view illustrating the simulated results of the reducing state in the model furnace of FIG. 1.

To examine the reduction which advances in the shaft furnace, therefore, the reduction ratio in the shaft furnace as shown in FIG. 1 was analyzed using a finite element method with the help of a computer under ordinarily employed operation conditions (iron grade of ore pellets 66%, reduction gas composed of 50% of $H_2$, 30% of CO, the remainder being $H_2O$, $CO_2$, $CH_4$, $N_2$, and temperature of reduction gas at a blowing nozzle of 770° C.). The results were as illustrated in FIG. 5, which further indicates a boundary line between the plug-flow zone PF and the shear-flow zone SF of FIG. 3. As will be understood from FIG. 5, when the shaft furnace is operated under ordinary operation conditions, the zone in which the reduction ratio lies from 50 to 70% in the shaft furnace is included in the plug-flow zone where the clustering easily takes place.

To avoid the formation of clustering, therefore, it is necessary to provide a mechanism for destroying the plug-flow state in or just above the zone where the reduction ratio lies from 50 to 70%, so that the plug-flow zone PF stays above the zone of the reduction ratio of 50 to 70%. By so doing, the zone in which the reduction ratio lies from 50 to 70% creates a shear flow such that the ore layer descends, being revolved relative to each other or being linearly moved relatively to each other, and the formation of cluster is prevented.

Figure 6A:
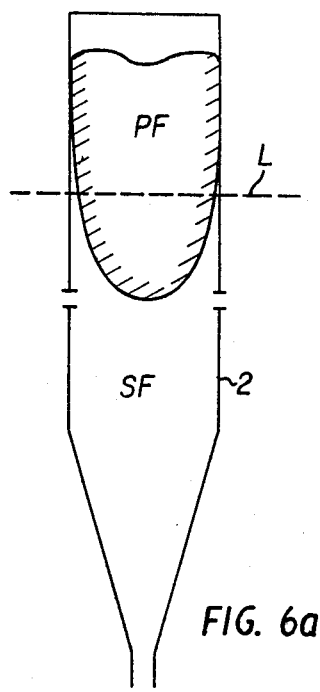
FIG. 6(a) is a cross-sectional diagram of a shaft furnace showing a relation between the plug-flow zone and the reduction zone where the reduction is performed to a ratio of 50 to 70%.

Below is mentioned, with reference to FIG. 6(a), means for expanding the shear-flow zone SF when the zone of 50 to 70% reduction exists in the plug-flow zone PF.

Figure 6B:
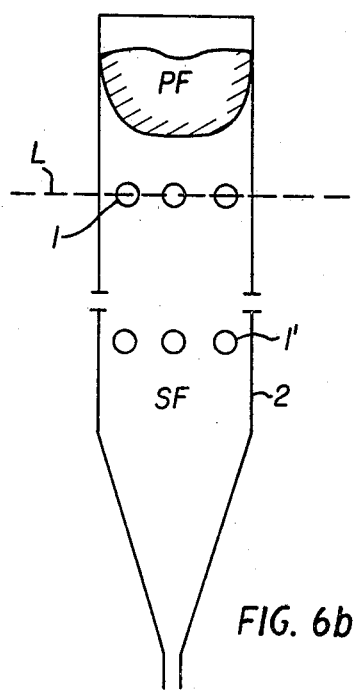
FIGS. 6(b) and 6(c) are cross-sectional diagrams illustrating the shaft furnaces according to the present invention.

FIG. 6(b) illustrates a method in which burden feeders 1 are arrayed not only in the lower reduction zone but also in the zone of 50 to 70% reduction, to lift up the shear-flow zone SF to a position which is considerably above the zone of 50 to 70% reduction in order that the plug-flow zone PF stays in the upper portion of the shaft furnace 2.

Figure 6C:
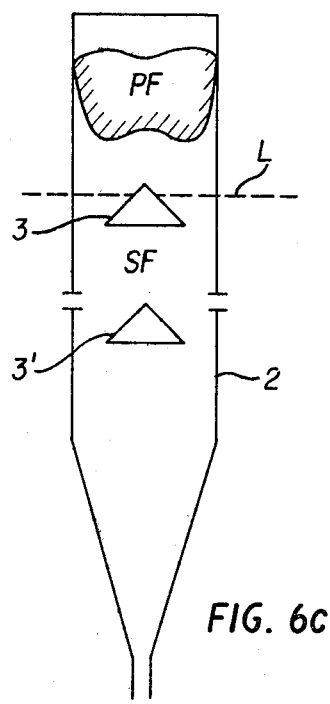

FIG. 6(c) shows a method in which a conical baffle plate 3 is installed above the zone of 50 to 70% reduction, to expand the shear-flow zone SF up to the upper portion of the zone of 50 to 70% reduction. The burden feeders or buffle plate may further be installed in the lower zone of the furnace as denoted by 1', 3' in FIGS. 6(b) and 6(c), to more effectively restrain the development of clustering phenomenon.

Figures 7, 8A, 8B:
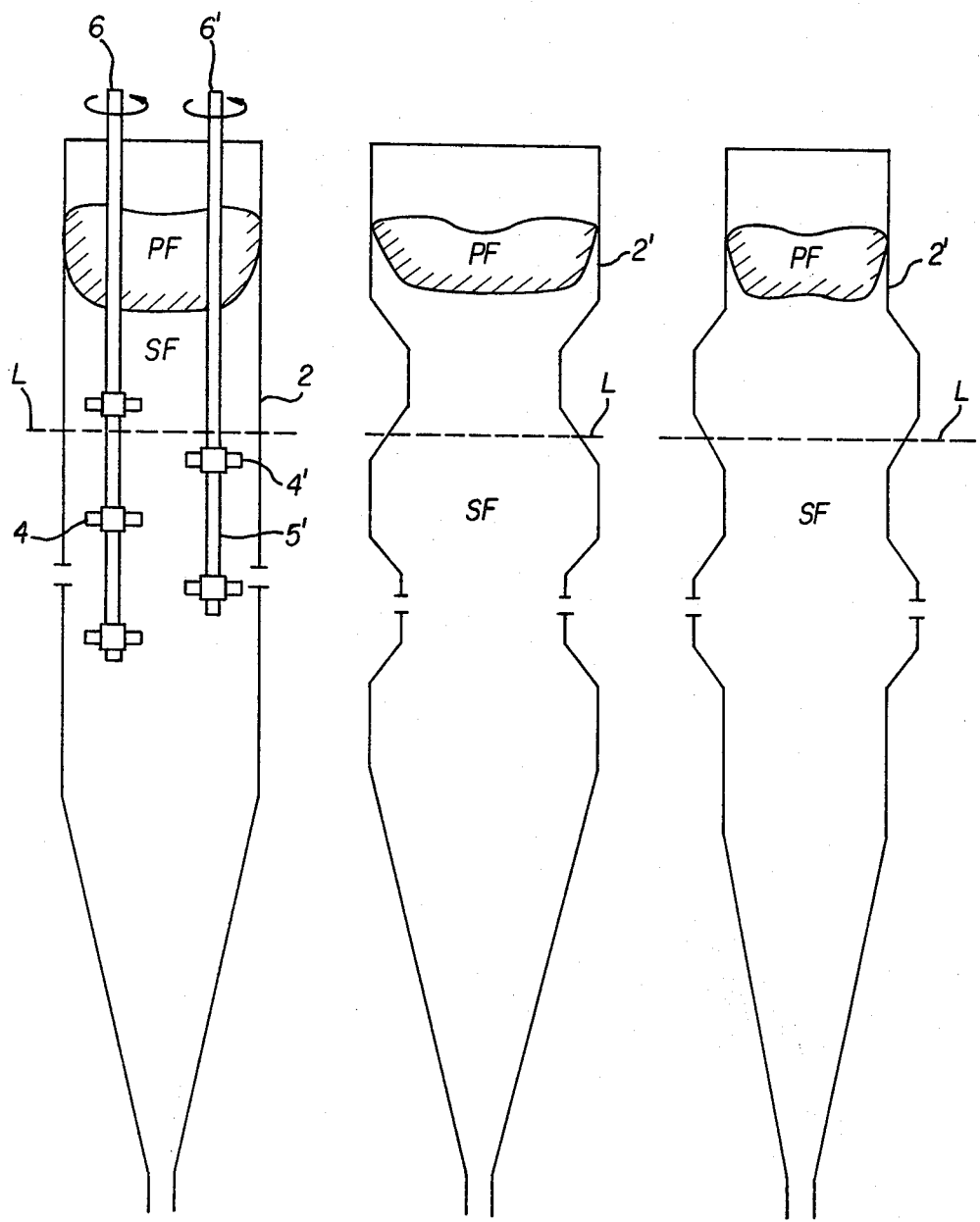
FIG. 7 is a cross-sectional view illustrating the shaft furnace according to a further embodiment of the present invention.
FIGS. 8(a) and 8(b) are cross-sectional views illustrating the shaft furnaces according to yet further embodiments of the present invention.

According to an embodiment shown in FIG. 7, agitating devices 6, 6-consisting of many agitating wings 4, 4' attached to drive shafts 5, 5-are rotated in the shaft furnace 2 around the zone of 50 to 70% reduction, in order to lift up the shear-flow zone SF above the zone of 50 to 70% reduction, so that the plug-flow zone PF is limited to the upper portion of the shaft furnace 2.

In the aforementioned embodiments, means 1, 3 and 6 for positively disturbing the flow of ore layer were provided in the shaft furnace 2 to expand the shear-flow zone SF. Referring to FIGS. 8(a) and 8(b), on the other hand, further embodiments are shown in which the cross-sectional areas of the shaft furnace 2' may be stepwisely changed in the zone of 50 to 70% reduction to expand the shear-flow zone SF, so that the cross-sectional areas on the zone of 50 to 70% reduction are reduced or increased by a predetermined ratio to expand the shear-flow zone SF while imparting radial acceleration to the flow of ores in the furnaces.

The construction itself of the shaft furnace for reducing ores, which is capable of preventing the clustering, will now be described, with the principle of the present invention being first discussed.

(I) Relation between the reduction ratio in the furnace and the shrinkage ratio of ore layer:

As mentioned earlier, the clustering takes place by the intertwining of fibrous metallic iron which forms in the step of forming metallic iron. The layer of ore pellets undergoes the plastic deformation due to the softening of ores accompanying the progress of reduction reaction and due to the increase in the pressure, and is hence shrunk. The shrinkage of the ore layer means that contacting surfaces among the ore particles are increased, causing the cohesion among the ores to be increased and the clustering to be grown.

The relation between the reduction ratio in the furnace and the shrinkage ratio of ore layer is as mentioned earlier in detail with reference to FIG. 4.

(II) Relation between the shrinkage ratio and the cluster strength:

As will be obvious from the foregoing description, the shrinkage of ore layer is very intimately related to the development of clustering. However, so far as the formed cluster is brittle, it is crushed again by the normal pressure and shear pressure generated in the ore layer during the descending step, and presents almost no problem for the operation.

What becomes a problem for the operation is the cluster which has a high degree of bonding (or which has a high clustering strength).

For the purpose of convenience, therefore, the cluster strength CS is defined as follows:

$$CS = (W's/Ws) \times 100$$

where Ws denotes the weight (g) of the cluster on a sieve when it is taken out as a specimen, and W's denotes the weight (g) of the cluster on a sieve after it is introduced into a steel cylinder having an inner diameter of 120 mm and a length of 700 mm and is rotated at 30 rpm for 5 minutes.

Figure 9:
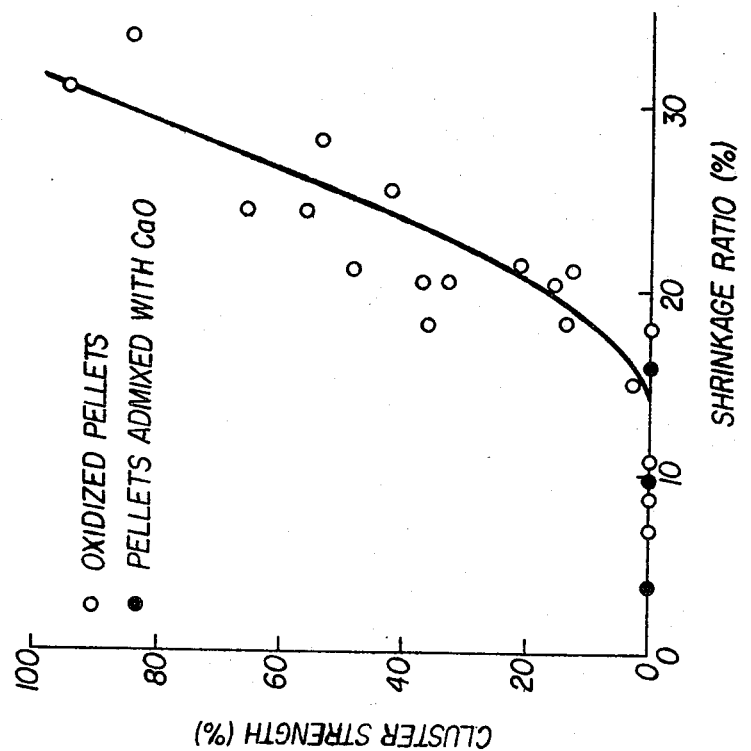
FIG. 9 is a graph showing a relation between the shrinkage ratio of ores and the cluster strength.

The relation between the thus defined cluster strength and the shrinkage ratio is as shown in FIG. 9.

Referring to FIG. 9, a characteristic feature is that when the shrinkage ratio of ores is smaller than about 15%, the cluster strength CS is zero, that is, the cluster does not substantially have strength. As the cluster strength CS exceeds 15%, the cluster strength rapidly increases in proportion to the increase in the shrinkage ratio.

Accordingly, if the shrinkage ratio of ore layer is restrained to be smaller than 15%, the cluster can be practically neglected even if it is formed.

(III) Relation between the pressure of the ore layer and the shrinkage ratio:

It was clarified in (II) above that the development of cluster can be almost all prevented if the shrinkage ratio of the ore layer is smaller than 15%. Below is mentioned how the pressure created by the weight of the ore layer would affect the shrinkage in the shaft furnace.

Figure 10:
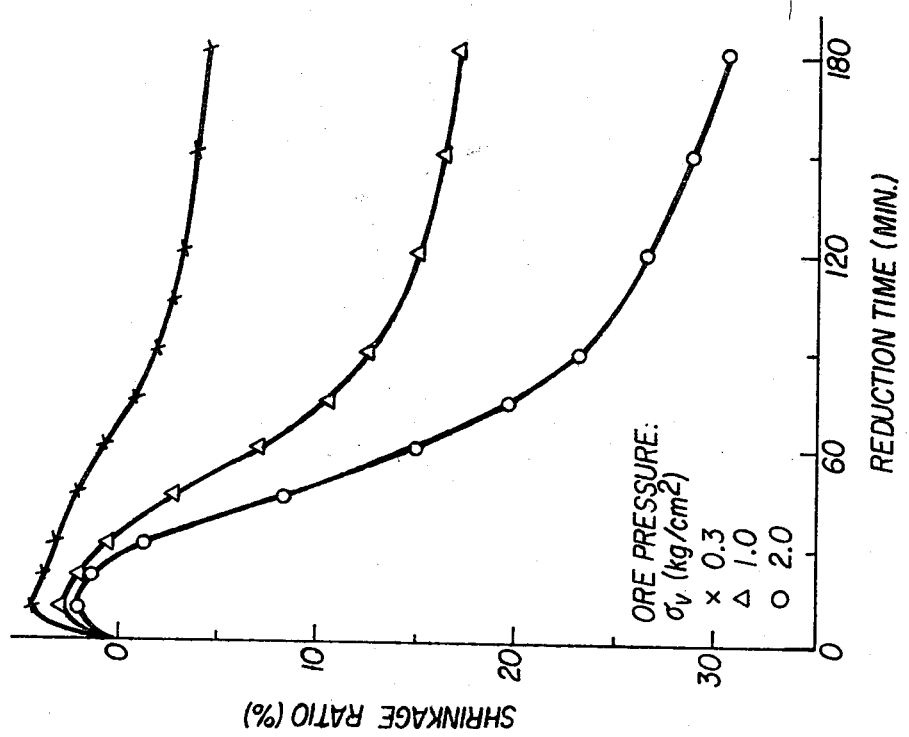
FIG. 10 is a graph showing the change in shrinkage ratio with respect to the reduction time under various pressure $\sigma_V$.

FIG. 10 is a diagram which shows the change in shrinkage ratios of the ore layer when high-grade oxidized pellets of an iron grade of 68.4% are reduced at a reduction temperature of 960° C. under the pressures of 0.3, 1.0 and 2.0 kg/cm².

As will be obvious from FIG. 10, the shrinkage ratio is smaller than 10% when the pressure $\sigma_V$ is 0.3 kg/cm², smaller than about 15% when the pressure $\sigma_V$ is 1.0 kg/cm², but reaches as great as 30% when the pressure $\sigma_V$ is 2.0 kg/cm².

Therefore, if the pressure in the furnace is maintained to be smaller than 1.0 kg/cm², the shrinkage ratio of the ore layer can be restrained to be smaller than about 15%. In that event, even if the cluster is formed, it is so brittle that no problem is presented for the operation.

As mentioned earlier, the clustering phenomenon develops with the increase in the reduction temperature. In other words, the clustering phenomenon develops depending upon the reduction temperature. Using the aforementioned oxidized pellets (iron grade of 68.4%), therefore, the reduction was effected at various reduction temperatures and under various pressures to find critical pressures (pressures under which the shrinkage ratio becomes about 15%) at each of the reduction temperatures. The results were as shown in FIG. 11, in which the region on the right side of a curve A is a zone where the clustering takes place. Calculation indicates that the curve is given by, $$\sigma_C = \exp(8.6 - 0.009T)$$

where
$\sigma_C$ is a critical pressure (kg/cm²),
T is a temperature (°C.) of the reduction gas.

(IV) Relation between the pressure in the furnace and shape of furnace:

In order to contrive the furnace shape by which the pressure $\sigma_V$ in the furnace becomes smaller than the aforementioned critical pressure $\sigma_C$, the distribution of pressure in the furnace is first considered below.

The ores can be treated as granular substances. Therefore, by using the Janssen's equation which is applied for the pressure distribution of granular substances in a vessel, the vertical pressure $\sigma_V$ is given by, $$\sigma_v = \frac{\gamma R}{2\mu\omega K}[1 - \exp(-K\mu\omega h/R)]$$

where
R: a hydraulic radius,
$\mu\omega$: a coefficient of friction between particles and walls of the vessel,
h: a depth from a free surface,
$\gamma$: a bulk density $$K:\text{ Rankin's constant, i.e., } K = \frac{1 - \sin\phi i}{1 + \sin\phi i}$$

$\phi i$: an angle of friction.

Measurement of pressure created by the ore pellets in the vessel also indicated that the above Janssen's equation can be employed to indicate the approximate average value of the pressures. Measurement indicated that the bulk density $\gamma$ was about 0.0025 (kg/cm³), the frictional coefficient $\mu\omega$ with respect to the walls was about 0.7, the angle of friction $\phi i$ was about 40°, and, therefore, the constant K was about 0.218.

According to the above equation, the pressure $\sigma_V$ in the furnace becomes maximum at an infinite depth h. Therefore, a maximum pressure $\sigma_{Vmax}$ in the furnace is given by, $$\sigma_{Vmax} = \frac{\gamma R}{2\mu\omega K}$$

Accordingly, the hydraulic radius R (cm) by which the maximum pressure $\sigma_{Vmax}$ in the furnace does not exceed the critical pressure $\sigma_C$ is given by, $$R \leq 120\sigma_C = 120 \exp(8.6-0.009T)$$

In the field of hydrodynamics, if the cross-sectional area of the flow is denoted by F, and if the whole length of the contacting portions between the flow and the wall forming the flow path in the cross-sectional area is denoted by U, i.e., if the wetted perimeter is denoted by U, the hydraulic radius R is given by, $$R = 2F/U$$

With regard to the shaft furnace, the cross-sectional area in the flow of ores can be detected by F, and the total length of the walls of the shaft furnace coming into contact with the ores in the cross-sectional area can be denoted by U.

By setting the hydraulic radius of the shaft furnace in accordance with the above-mentioned conditions, the shrinkage ratio of the ore layer can be restrained to be less than 15% so that the cluster strength becomes substantially zero.

As mentioned already in (I) above, the cluster is formed in the lower reduction zone where the reduction ratio reaches 50 to 70% or more. Hence, the condition of the above-mentioned hydraulic radius needs to be satisfied at least in the lower reduction zone.

The reason why Janssen's equation was applied for calculating the pressure in the furnace was because the following facts were clarified by the experiments conducted by the inventors.

(a) The direction of a maximum pressure in the ore layer which flows in the vessel due to the gravity changes depending upon the time and place. An overpressure, that is, a so-called switch pressure is generated when the maximum pressure changes from the active state in which it is directed in the vertical direction to the passive state in which it is directed in the horizontal direction. Here, the pressure develops locally and instantaneously. Therefore, the average pressure which participates in the shrinkage of the ore layer is found by Janssen's equation by which the maximum pressure is presumed to work in the vertical direction.

(b) Janssen's equation cannot be correctly applied when the furnace wall is tilted relative to the vertical direction. In practically designing the furnace on an industrial scale, however, the error can be neglected.

Among the experiments of reduction from which the relation of FIG. 11 was derived, the results of the changes in shrinkage ratio of the ore layer when the reduction was carried out under the pressure of 2 kg/cm² and at three different temperatures, i.e., 860° C., 910° C. and 960° C. are shown in FIG. 12. It will be understood that when the reduction temperature is 860° C., no remarkable shrinkage takes place; i.e., the shrinkage ratio is smaller than about 10%. The reduced iron of the shrinkage ratio of about 10% was partially adhered with each other. The adhesion, however, was easily crushed with finger and was not so serious as to form the cluster. When the reduction temperature was higher than 910° C., on the other hand, the shrinkage developed markedly with the progress of the reduction reaction. With the temperature of 900° C. as a boundary, conspicuous shrinkage takes place when the reduction temperature is higher than 900° C. Observation of the reduced iron having a shrinkage ratio of about 30% reduced at a temperature of 960° C. indicated that the reduced iron was completely clustered.

The above observation supports the conclusion of (II) above. Namely, the clustering becomes a problem when the reduction is performed at a temperature of higher than 900° C. That is, the high-temperature reduction referred to in this invention represents the case when the reduction is performed at temperatures in excess of 900° C.

Figure 13:
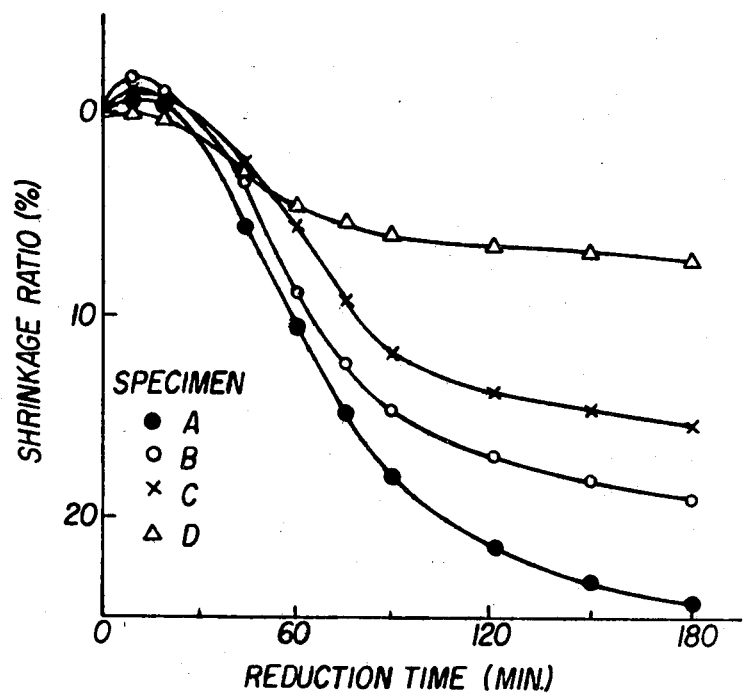
FIG. 13 is a graph showing the change in shrinkage ratio with respect to the reduction time when various raw materials are used.

Further, since the properties of the raw materials affect the clustering, investigation was conducted in regard to the relation between the properties of the raw materials and the shrinkage ratio. FIG. 13 is a diagram illustrating the changes in shrinkage ratio of ore layers when four kinds of pellets, i.e., pellets having an iron grade of 68.4% (specimen A), pellets having an iron grade of 65.6% (specimen B), pellets having an iron grade of 63.8% (specimen C), and pellets having an iron grade of 67.0% admixed with 0.63% of CaO (specimen D), are reduced at a temperature of 910° C. under a pressure of 2 kg/cm². It will be recognized from FIG. 13 that when the raw material C of a low iron grade (smaller than 65%) or when special pellets C admixed with CaO are used, the shrinkage ratio is smaller than about 15% and the clustering is not substantially developed. The raw materials having low iron grades, however, encounter such problems that the productivity is decreased or it is obliged to use specially prepared pellets. Pellets having high iron grades (65% or more), on the other hand, develop the problem of clustering more frequently. Therefore, if the problem of clustering is solved by any means other than the iron grade, the raw materials having any properties can be used without developing the clustering.

The shaft furnace which satisfies the condition of the hydraulic radius R when the reduction gas is blown at a temperature of 950° C. is described below.

According to the following equation, $R \leq \exp(8.6-0.009T)$, when $T=950°$ C., $R \leq 126$ cm and $\sigma_C = 1.05$ kg/cm². Therefore, as far as the shaft furnace fulfills $R \leq 1.26$ m and $\sigma_V \leq 1.05$ kg/cm², it is possible to prevent the clustering.

(A) Double cylindrical shaft furnace

Figure 14:
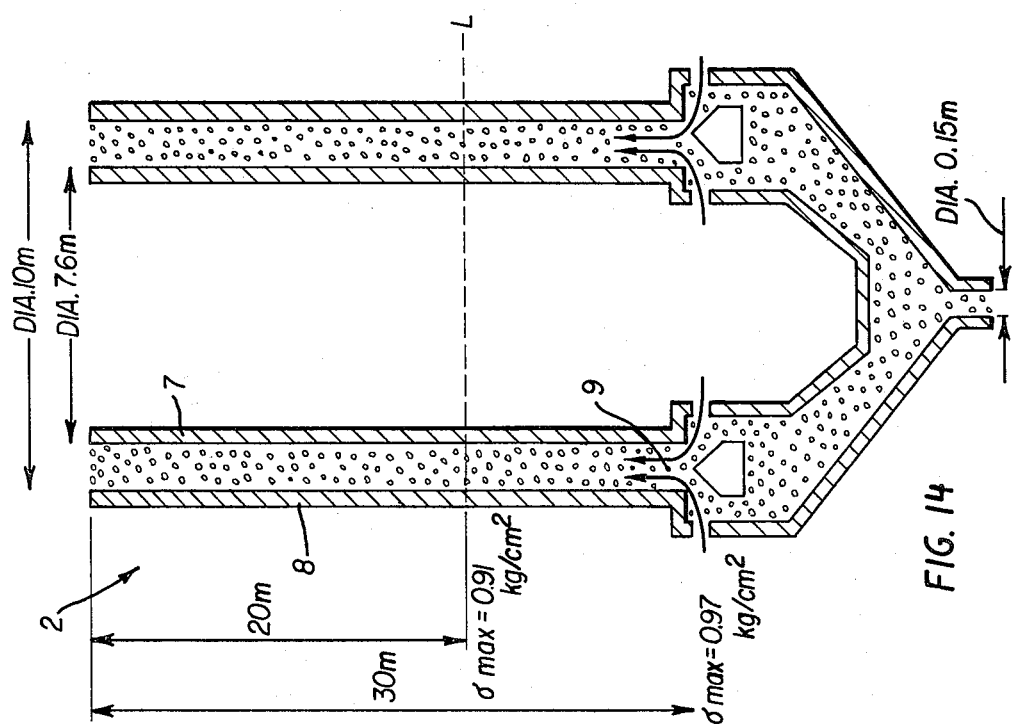

A shaft furnace 2 shown in FIG. 14 consists of a double cylinder, the diameter of an inner cylinder 7 being 7.6 m, the diameter of an outer cylinder 8 being 10 m, and the height of the reduction portion being 30 m. The hydraulic radius R is 1.2 m, the pressure $\sigma_V$ in the 50 to 70% reduction zone is 0.91 kg/cm², and the pressure $\sigma_V$ in a bustle port 9 for blowing the reduction gas is 0.97 kg/cm².

With the cylindrical furnace having the same cross-sectional area and height as those of the above shaft furnace 2, the diameter will be 3.25 m, i.e., the hydraulic radius R will be 1.625 m, the pressure in the 50 to 70% reduction zone will be 1.13 kg/cm², and the pressure in the bustle port will be 1.26 kg/cm². Therefore, there develops such a pressure that the shrinkage ratio becomes 10 to 15% or higher, whereby the cluster strength is remarkably increased to interrupt the operation as mentioned in (II) above.

(B) Modified double cylindrical shaft furnace

Figure 15:
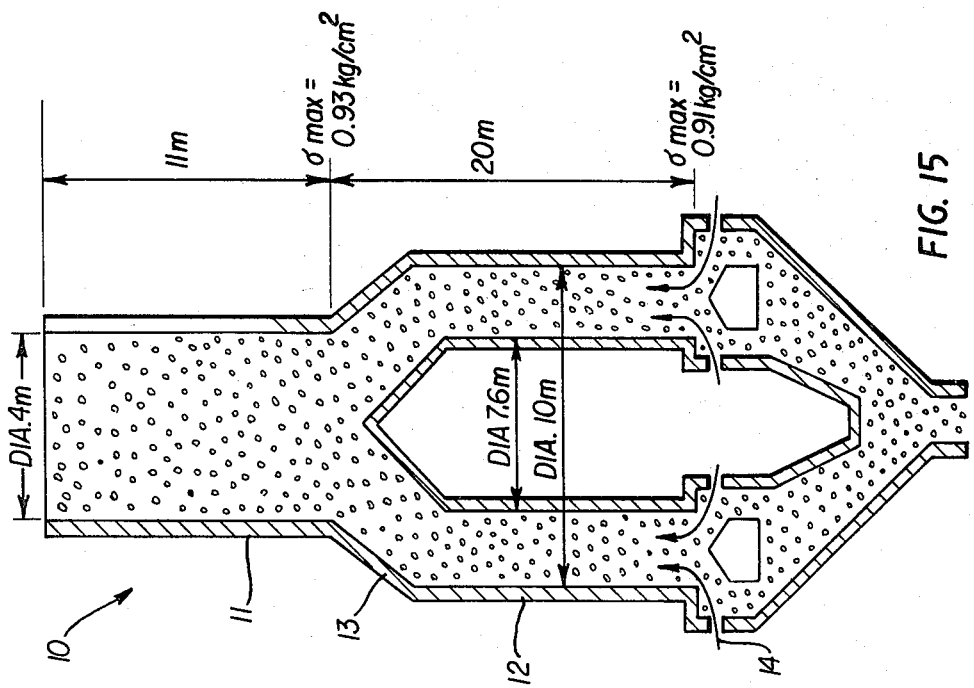

A shaft furnace 10 shown in FIG. 15 has an upper portion of a diameter of 4 m, a cylindrical portion 11 of a height of 11 m, and a double cylindrical portion 12 like that of FIG. 14, wherein the cylindrical portion 11 and the double cylindrical portion 12 are connected together by a conical portion 13. The pressure $\sigma_V$ at the lowest portion of the cylindrical portion 11 is 0.93 kg/cm$^2$, and the pressure $\sigma_V$ in a bustle port 14 of the double cylindrical portion 12 is 0.91 kg/cm$^2$.

(C) Multi-cylindrical shaft furnace

A shaft furnace 20 shown in FIG. 16 has cylinders 21, 22, 23 and 24 of diameters of 2.4 m, 4.8 m, 7.2 m and 9.6 m, that are combined in concentric relation with each other and in a multi-cylindrical manner. Hydraulic radii R of the shells are all 1.2 m, the pressure $\sigma_V$ in the 50 to 70% reduction zone is 0.91 kg/cm$^2$, and the pressure $\sigma_V$ in a bustle port 25 is 0.97 kg/cm$^2$.

With a single-cylinder furnace having the same cross-sectional area as that of the shaft furnace 20, the hydraulic radius R will be 4.8 m, the pressure in the 50 to 70% reduction zone will be 1.87 kg/cm$^2$, and the pressure in the bustle port will be 2.44 kg/cm$^2$.

(D) Parallel-type shaft furnace

Figure 19:
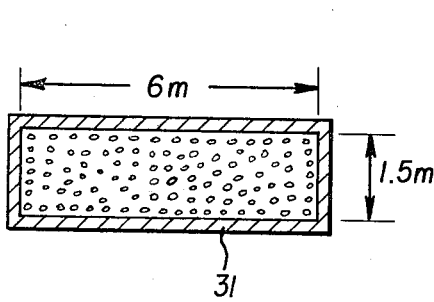
FIG. 19 is a cross-sectional view illustrating a square cylinder/chambers of FIG. 17.

Shaft furnaces 30, 40 shown in FIGS. 17 and 18 consist of a combination of single cylinder containers 31, 41 having a rectangular shape in cross section or an elliptical shape in cross section with their longer sides being arrayed in parallel with each other. With reference to the cross section of the single cylinder chamber 31 of FIG. 19, the hydraulic radius R will be 1.2 m when the longer side is selected to be 6 m and the shorter side is selected to be 1.5 m.

(E) Partitioned shaft furnace

Figure 20:
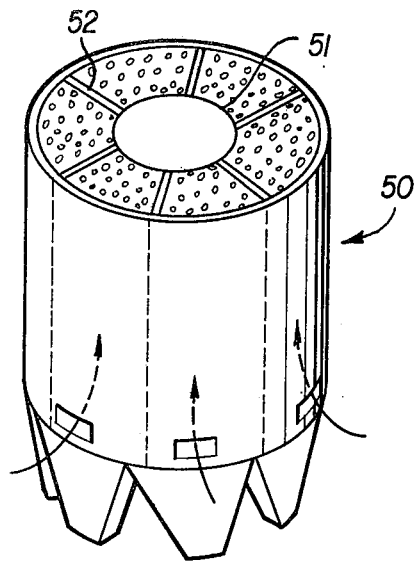
FIGS. 20, 21 and 22 are perspective views schematically illustrating the shaft furnaces according to further embodiments of the present invention.
Figure 21:
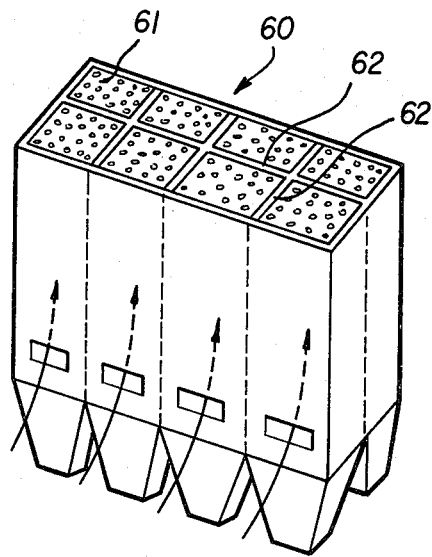
Figure 22:
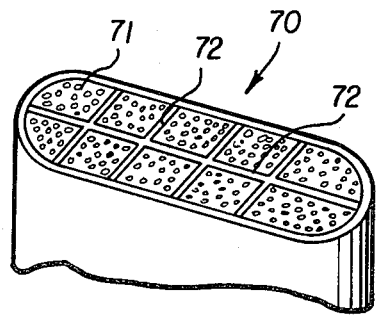

Shaft furnaces 50, 60 and 70 shown in FIGS. 20, 21 and 22 consist of a double cylinder 51, a square cylinder chamber 61 having a rectangular shape in cross section, and a cylinder chamber 71 having an elliptical shape in cross section, which are partitioned into nearly equal areas by partitioning boards 52, 62, and 72. By utilizing the partitioning boards, it is possible to design the shaft furnaces having great total cross-sectional areas yet maintaining small hydraulic radius.

(F) Shaft furnace having divided lower portions

Figure 23:
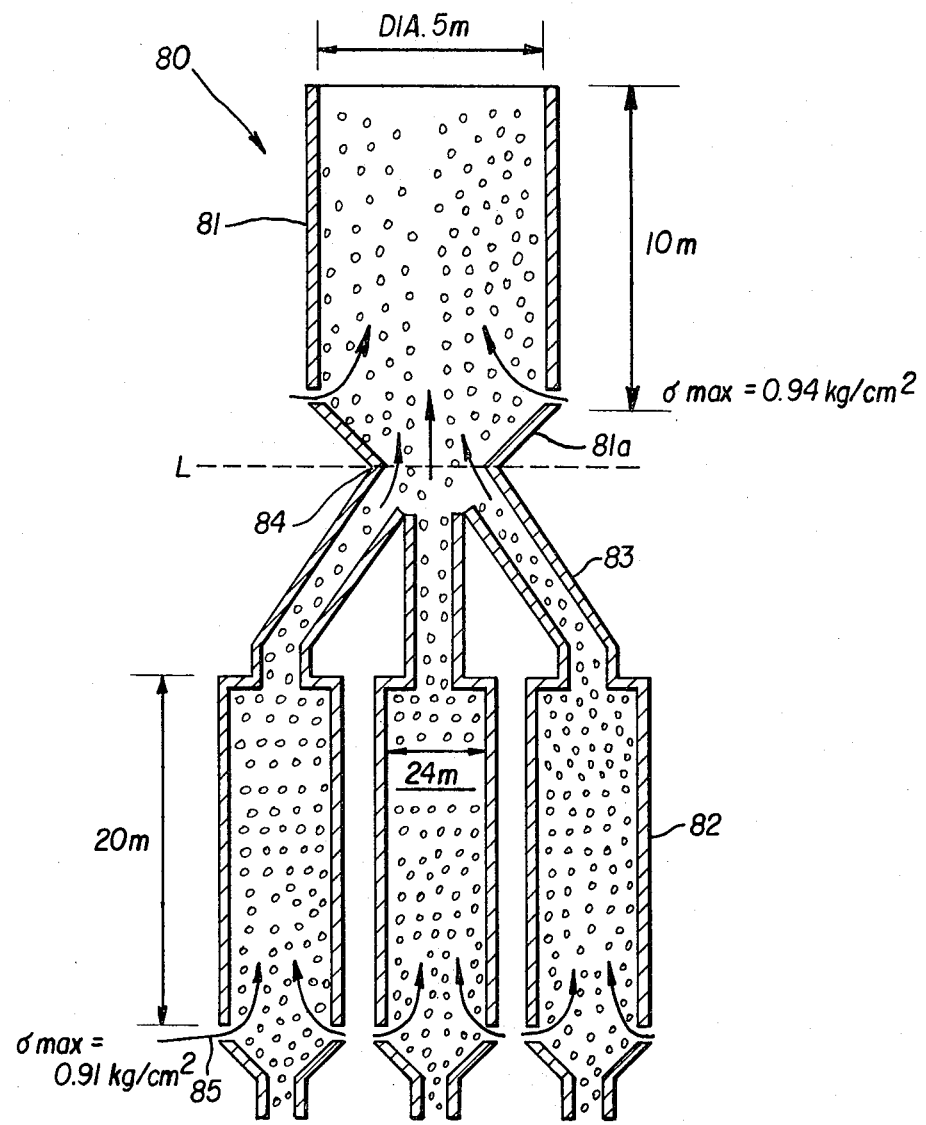
FIG. 23 is a cross-sectional view illustrating the shaft furnace according to still further embodiment of the present invention.

A shaft furnace 80 illustrated in FIG. 23 consists of a single cylinder 81 which is 5 m in diameter and 10 m in height, and which is located in the upper portion, and three small cylinders 82 which are 2.4 m in diameter and 20 m in height, and which are located in the lower portion. A conical portion 81a at the bottom of the single cylinder 81 is communicated with the upper portion of the small cylinders 82 via communication pipes 83. Here, the 50 to 70% reduction zone should be located near a branching portion 84, and an auxiliary bustle port 85 for blowing the reduction gas should also be formed in the lower portion of the single cylinder 81.

The communication pipes 83 should have sufficient cross-sectional areas such that ores are not clogged therein.

In this case, the pressure $\sigma_V$ in the lowest portion of the single cylinder 81 is 0.94 kg/cm$^2$, and the pressure $\sigma_V$ in a bustle port 82a of the small cylinders 82 is 0.91 kg/cm$^2$.

As will be obvious from the foregoing description, according to the shaft furnace for reducing ores in the present invention, a plug-flow zone in which the cluster develops is changed to a shear-flow zone, so that the formation or growth of cluster is inhibited or restrained by the shear flow. Further, with the shaft furnace of the present invention which is so constructed that a hydraulic radius which is smaller than a predetermined value is maintained in a zone of reduction ratio of at least 50% or more, the cluster strength can be substantially brought into zero in the reduction zone where the cluster is formed, making it possible to eliminate the problem of clustering which interrupts the operation.

The shaft furnace having the aforementioned features completely eliminates the problem of clustering, and enables the productivity to be further increased.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A shaft furnace for reducing ores with a gas comprising:
    a reduction zone formed along a predetermined height of said furnace;
    a plug flow zone formed in an upper portion of said reduction zone of said furnace during reduction operation;
    a shear flow zone formed in a portion of said reduction zone of said furnace downstream of said plug flow zone; and
    means operatively connected to said furnace in said reduction zone for shifting said shear flow zone to a position upstream of a portion of said reduction zone where a reduction ratio of 50 to 70% occurs, wherein said means for shifting comprises a hydraulic radius in the reduction zone where a reduction ratio greater than 50% occurs, defined by the formula:

$$R \leq 120 \exp. (8.6 - 0.009T),$$

wherein R is the hydraulic radius and T is the temperature (°C.) of the reducing gas.

* * * * *

UNITED STATES PATENT AND TRADEMARK OFFICE
CERTIFICATE OF CORRECTION

PATENT NO. : 4,380,328

DATED : April 19, 1983

INVENTOR(S) : HIROYUKI KOHAMA ET AL

It is certified that error appears in the above-identified patent and that said Letters Patent is hereby corrected as shown below:

In column 2, line 16, delete "inventin" and insert therefor --invention--;

In column 2, line 61, delete "slected" and insert therefor --selected--;

In column 4, line 13, after "furnace" insert --s--;

In column 4, line 19, after "reduc-tion." insert --)--;

In column 6, line 31, delete "relatively" and insert therefor --relative--;

In column 6, line 48, delete "buffle" and insert therefor --baffle--;

UNITED STATES PATENT AND TRADEMARK OFFICE
CERTIFICATE OF CORRECTION

PATENT NO. : 4,380,328

DATED : April 19, 1983

INVENTOR(S) : HIROYUKI KOHAMA ET AL

It is certified that error appears in the above-identified patent and that said Letters Patent is hereby corrected as shown below:

In column 6, line 53, delete "6, 6-consisting" and insert therefor --6, 6' consisting--;

In column 6, line 54, delete "5, 5-are" and insert therefor --5, 5' are--;

In column 8, line 29, delete "(°C.)" and insert therefor --(°C)--;

In column 9, line 6, delete "$\sigma$ V max" and insert therefor --$\sigma$ V max--;

In column 10, line 45, delete "following equation, $R \leq$" and insert therefor --foregoing equation, $R \leq 120 \sigma$ C = 120--;

In column 11, line 31, after "cylinder" insert --/--.

Signed and Sealed this

Seventeenth Day of April 1984

[SEAL]

Attest:

GERALD J. MOSSINGHOFF

Attesting Officer

Commissioner of Patents and Trademarks